UNITED STATES PATENT OFFICE.

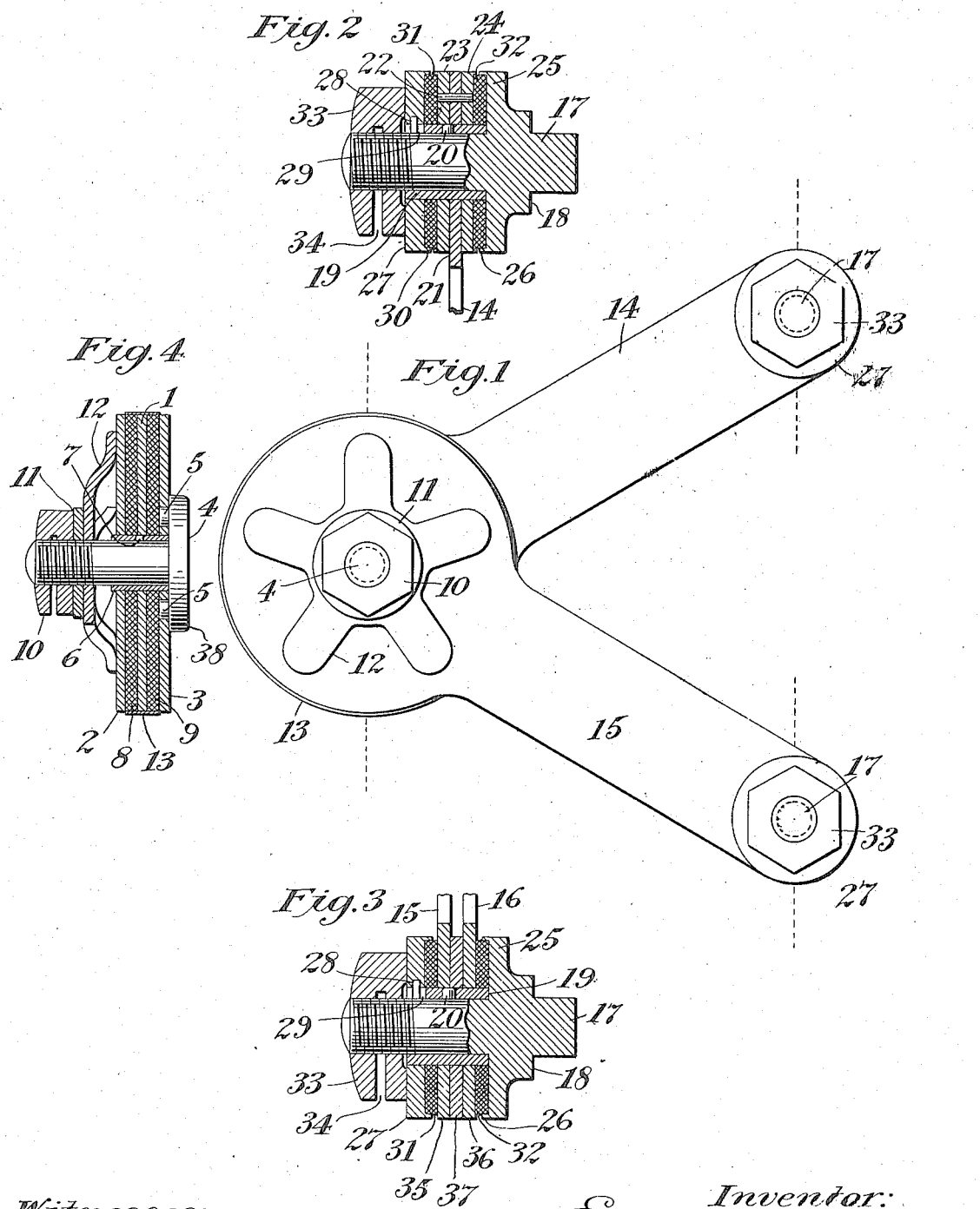

EDWARD V. HARTFORD, OF NEW YORK, N. Y.

SPRING-RETARDING DEVICE.

1,128,782. Specification of Letters Patent. Patented Feb. 16, 1915.

Application filed December 26, 1906. Serial No. 349,460.

*To all whom it may concern:*

Be it known that I, EDWARD V. HARTFORD, a citizen of the United States, residing in the city, county, and State of New York, have invented certain new and useful Improvements in Spring-Retarding Devices, of which the following is a full, clear, and exact specification.

My invention relates to spring retarding devices used for the purpose of checking or retarding the violent oscillations of springs in spring-supported vehicles, and is particularly advantageous for use in automobiles, although it may be applied as well to other types of spring-supported vehicles.

The object of my invention is to provide an improved friction joint for use in such devices which may be used to advantage in attaching the arms thereof to the running gear and body portion respectively of the vehicle, or it may be used for creating friction in the principal friction joint of the device.

In the accompanying drawing Figure 1 illustrates a side elevation of the device, wherein my improved friction joints are shown at the outer ends of the upper and lower arms. Fig. 2 is a central, vertical section of the joint attached to the upper arm in Fig. 1. Fig. 3 is a similar view of the joint attached to the lower arm, and Fig. 4 is a similar view of the central friction joint.

The form of device in connection with which I have illustrated my invention is that wherein a central friction joint is used, employing a central friction disk 1, and outer friction disks 2, 3, which are mounted to rotate upon a connecting stud or bolt 4, having an enlarged head 38, which is pinned to the disk 3 at 5. The stud carries a bushing 6, shown pinned to it at 7. Between the inner friction disk 1, and the outer friction disks 2 and 3, are washers 8, 9, composed of friction material, such as vulcanized fiber, leather, etc. The parts are held in place upon the said bushing by threaded nut 10, which engages a thread on the outer end of bolt 4 and bears against washer 11, which, in turn, engages the convex body of a spring spider 12, the feet of which press against the outer disk 2. Disks 1 and 2 and friction washers 8 and 9 have lateral play on bushing 6, and the tightening of the nut 10 will adjust the pressure upon the parts and the consequent friction, and this is maintained against wear by the spring spider 12. A band 13 encircles the parts. Central friction disk 1 is formed integral with, or otherwise rigidly attached to upwardly projecting arm 14, and the outer friction disks 2 and 3 are similarly attached to downwardly projecting arms 15, 16. The arms, as it were, are thus frictionally connected. There is a two-part arm 15 and 16, and a one-part arm 14.

The above-named parts are described here for clearness and understanding of the device, and no claim is here made to such construction in itself, but my present invention resides in the parts now to be described, and use thereof in combination with additional friction means.

The tail pieces or means for attaching the one-part arm 14 and the two-part arm 15, 16, to the body portion and running gear respectively of the vehicle are shown the same in all essential particulars, differing only in minor details, due to the fact that there is but one member to the arm 14, while two members or parts 15, 16, constitute the other arm. I will first describe such tail piece shown herein as applied to arm 14. This consists of a stud 17, which is adapted to pass through the vehicle body and to be secured thereto by some suitable means, as by riveting, and for this purpose is equipped with a shoulder 18, to enable it to fit flush against the body. Upon this stud is mounted a bushing 19, which is pinned to the said stud at 20, so as to be fixed thereto. The bushing may in practice be hardened. A disk 21 is formed integral with or otherwise securely attached to arm 14, and has a central opening which fits bushing 19, and permits the said disk to rotate thereon. Attached to the said disk 21 by pin 22 are two flat washers 23, 24, which may be made of steel, and are designed to rotate in unison with disk 21, and substantially form part of and are an extension of said disk. These parts constitute the central friction member of the friction connection between the vehicle part and the single member arm 14.

Formed integral with stud 17 is friction disk 25, having a projecting peripheral ledge or flange 26, forming an annular recess within the said friction disk. A second outer friction disk 27 is mounted upon the bushing 19, at the outer end thereof, and has a pin 28, which enters a slot 29, in the bushing 19. By means of the said pin and slot connection, said recessed disk 27 is fixed on the said bushing against rotary movement, but is permitted to have a lateral or sliding movement thereon. Disk 27 has a peripheral flange or ledge 30 similar to that on disk 25, forming an annular recess on the inner face of the said disk.

Between the washer 23 and recessed disk 27 and the washer 24 and recessed disk 25, are contained flat washers 31, 32 of friction material, which are received and partly inclosed by the recesses in disks 27, 25. These washers may be of any suitable material, such as vulcanized fiber, leather, etc., and furnish the friction desired.

The outer end of stud 17 is threaded and receives a threaded nut 33. Said nut has a slit at 34, formed by a saw kerf or in any other suitable manner, by which said nut is compressed previous to application, and which being expanded in applying it to the stud, constitutes an effective lock.

It will be perceived that disks 25 and 27 are held against rotary movement relative to the stud, whereas disk 21 and its attached disks or washers 23, 24, are permitted to rotate thereon, thereby causing the washers 31, 32, to exert friction upon the disks between which they are interposed; likewise that the said disks 21, 23, 24, and 27, and the friction washers 31 and 32 may be compressed upon tightening the nut 33 against the resistance of disk 25, whereby the pressure may be adjusted and wear compensated for. This nut is made large enough to engage a substantial part of the disk 27, applying pressure thereto over the larger part of its area, thereby insuring even pressure on the friction washer and preventing any buckling or warping of said disk. Recessed disk 27 being fixed against rotary movement, insures against an undesired loosening of the nut 33 in the operation of the device.

The method of attaching the two-part or member arm 15, 16, (the lower arm in the present illustration) to the running gear of the vehicle as illustrated in Fig. 3 is essentially the same as that shown of attaching the upper arm which is illustrated in Fig. 2, and the corresponding parts are, therefore, similarly designated. Owing to the fact, however, that there are two parts 15, 16, to this arm, whereas there is but one part 14, to the other arm, the two outer plates 23, 24 of Fig. 2 are omitted, and in their place there is situated between the friction disks 35, 36, which are connected to the arm parts 15, 16, a central washer 37, which spaces the arm parts 15, 16, apart, and which may be free upon the bushing 19. Plates 23 and 24 are employed for the purpose of maintaining the arm 14 in proper vertical position, so that it shall, in descending, pass between arm-parts 15 and 16, without interfering with either of them, and plate 37 is situated between the disks 35 and 36, so as to space arm-parts 15 and 16 apart to receive arm 14. The peripheral flanges 26 and 30 assist in maintaining the friction washers 31, 32 in shape and position, and in addition exclude dust, water, etc. If desired, these peripheral flanges may also be employed in the central rotating friction disks, 23, 24, 35, and 36. I have shown the disks 23, 24, provided with such flanges where they serve the same purpose as the similar flanges on disks 25, 27. Disks 35, 36, in the present showing, have plane outer faces.

It is obvious that many modifications and changes may be made in the exact construction shown and described without departing from the spirit of my invention, and I do not mean to limit myself to the specific form shown but

What I claim and desire to secure by Letters Patent is:—

1. In a spring-retarding device, an attaching stud, a hardened bushing thereon, a friction disk rotatably mounted on said bushing, friction material in contact with said disk, recessed friction retaining disks adapted to receive and partially inclose said friction material and fixed against rotary movement, said parts having a relative lateral movement, and adjustable means for holding said disks on said stud, substantially as described.

2. In a spring-supported vehicle, a spring retarding device comprising a central friction joint having a plurality of friction members movable relatively to each other, arms connecting the respective members of said friction joint to the running gear and body portion respectively of the vehicle, a friction connection between each arm and its connected part of the vehicle, comprising a plurality of friction members movable relatively to each other, friction material between said members and lying partly within a recess in one of said friction members, a support for said devices rigidly attached to the body and running gear, connections for holding one of said friction members in each friction connection against rotary movement, and attaching devices for securing said parts in position, substantially as described.

3. In a spring-supported vehicle, a spring retarding device comprising a central friction joint having a plurality of friction members movable relatively to each other, arms connecting the respective members of said friction joint to the running gear and body portion respectively of the vehicle, a friction connection between each arm and its connected part of the vehicle comprising a plurality of friction members movable relatively to each other, friction material between said members and lying partly within a recess in one of said friction members, supports for said devices rigidly attached to the body and running gear respectively, connections for holding one of said friction members in each friction connection against rotary movement, and permitting a lateral movement thereof, and adjustable attaching devices for securing said parts in position and regulating the pressure, substantially as described.

4. In a spring-supported vehicle, a retarding device comprising a central friction joint having a plurality of friction members movable relatively to each other, arms connecting the respective members of said friction joint to the running gear and body portion respectively of the vehicle, a friction connection between each arm and its connected part of the vehicle, comprising a stud fixed to the connected part of the vehicle, a plurality of recessed disks fixed to said hub, friction material adapted to be received and partially inclosed in said recesses, a friction disk attached to said arm and rotating on said hub, means whereby one of said recessed disks has a lateral movement on said hub, and adjustable means on said hub for securing the parts therein and applying pressure thereto, substantially as described.

5. In a spring-supported vehicle, a spring retarding device, comprising a central friction joint, having a plurality of friction members movable relatively to each other, arms connecting the respective members of said friction joint to the running gear and body portion respectively of the vehicle, a friction connection between each arm and its connected part of the vehicle, comprising a stud fixed to the connected part of the vehicle, a hardened bushing thereon, a recessed friction disk fixed to said hub against movement, a second recessed friction disk, a pin and slot connection between said last mentioned disk and said bushing, whereby said disk has a lateral movement, but is held against rotary movement, a central friction disk rotatably mounted upon said bushing and secured to said arm, friction washers between said central disk and said recessed disks and lying partly within said recessed disks, a threaded nut engaging a thread on said stud for holding the parts assembled and applying pressure thereto, substantially as described.

6. In a spring-supported vehicle, a spring retarding device, comprising a central friction joint having a plurality of outer friction members and an inner friction member, means for assembling said parts, a two-part arm, the parts thereof being respectively attached to said outer friction members, and a one-part arm attached to said inner friction member, and located in position to pass between the outer arms in use, friction connections between the said arms and the running gear and body portion respectively of the vehicle, each comprising a stud fixed to the connected part of the vehicle, a hardened bushing thereon, a recessed friction disk fixed to said stud against movement, a second recessed friction disk, a pin and slot connection between said last-mentioned disk and said bushing for permitting lateral movement of the disk and preventing rotation thereof, a central friction member rotatably mounted upon said bushing and secured to said arm, the central friction member in the connection for the two-part arm being in two parts, the parts being secured to the respective arm parts, friction washers between said central friction member and said recessed disks and lying partly within said recessed disks, a threaded nut engaging a thread on said stud for holding the parts assembled and applying pressure thereto, and a plate between the parts of the two-part central friction member for spacing the arm-parts, substantially as described.

7. In a spring-supported vehicle, a spring retarding device, comprising a central friction joint having a plurality of outer friction members and an inner friction member, means for assembling said parts, a two-part arm, the parts thereof being respectively attached to said outer friction members, and a one-part arm attached to said inner friction member, and located in position to pass between the outer arms in use, friction connections between the said arms and the running gear and body portion respectively of the vehicle, each comprising a stud fixed to the connected part of the vehicle, a hardened bushing thereon, a recessed friction disk fixed to said stud against movement, a second recessed friction disk, a pin and slot connection between said last-mentioned disk and said bushing for permitting lateral movement of the disk and preventing rotation thereof, a central friction member rotatably mounted upon said bushing and secured to said arm, the central friction member in the connection for the two-part arm being in two parts, the parts being secured to the respective arm parts, friction washers between said central friction member and said recessed disks and lying partly within said recessed disks, a threaded nut engaging a thread on said stud for holding the parts assembled and applying pressure thereto, and a plate between the parts of the two-part central friction member for spacing the arm parts, and plates attached to and rotatable with the central disk in the other central friction member, substantially as described.

8. In a spring retarding device having a movement resisting joint, the combination of means for attaching the device to two relatively movable parts of a vehicle, said means comprising a stud rigidly secured to each vehicle part, and a pair of arms connecting said joint to said studs, the outer terminals of said arms being apertured for rotary movement on said stud, non-rotatable retaining members carried by each stud and a plurality of washers interposed between the retaining members and each of said arms.

9. In a spring retarding device having a movement resisting joint, the combination of means for attaching the device to two relatively movable parts of a vehicle, said means comprising a stud rigidly secured to each vehicle part and a pair of arms connecting said joint to said studs, the outer terminals of said arms having flat surfaces and being apertured for rotary movement on said studs, non-rotatable retaining members having plane contacting surfaces carried by each stud, and a plurality of flat washers interposed between the retaining members and the adjacent end of the arm, and adjustable means for holding all of said parts in frictional contact on said stud.

In testimony whereof, I have hereunto set my hand in the presence of two subscribing witnesses.

EDWARD V. HARTFORD.

Witnesses:
  ARTHUR Z. HOFFMAN,
  ED. SHEPHERD.